United States Patent [19]

Vesel

[11] 4,014,025
[45] Mar. 22, 1977

[54] SCALLOPING SUPPRESSION SYSTEM AND METHOD

[75] Inventor: Andrew M. Vesel, Mount Arlington, N.J.

[73] Assignee: The Cessna Aircraft Company, Wichita, Kans.

[22] Filed: Mar. 24, 1975

[21] Appl. No.: 561,466

[52] U.S. Cl. .......................................... 343/106 R
[51] Int. Cl.² .......................................... G01S 1/50
[58] Field of Search .............................. 343/106 R

[56] References Cited
UNITED STATES PATENTS

| | | | |
|---|---|---|---|
| 3,725,933 | 4/1973 | Perkins et al. | 343/106 R |
| 3,792,473 | 2/1974 | Sawicki | 343/106 R |
| 3,887,921 | 6/1975 | Spratt et al. | 343/106 R |

Primary Examiner—Maynard R. Wilbur
Assistant Examiner—Richard E. Berger
Attorney, Agent, or Firm—Beveridge, DeGrandi, Kline

[57] ABSTRACT

A scalloping suppression system and method for use in a V.H.F. Omni Range (VOR) aircraft bearing determining system. The system is arranged to respond to changes in phase of the received radial which are due to position changes of the aircraft but not to respond to the generally more rapid changes in phase which are due to scalloping. A digital phase shifter-comparator network is employed to cause the phase of the reference signal to follow the phase of the variable phase signal. The phase shifter is comprised of two counters and the phase comparator is comprised of a bistable multivibrator. The delayed reference signal is the output of the system and an analog rate controller is employed to limit the rate at which the reference signal can follow the variable phase signal. The limiting is effected in proportion to DME distance which is inputted to the rate controller as an analog voltage.

24 Claims, 17 Drawing Figures

SCALLOPING SUPPRESSION SYSTEM AND METHOD

The present invention relates to an improved scalloping suppression system and method primarily for use in a V.H.F. Omni Range (VOR) aircraft angular position determining system.

A VOR aircraft navigation system is used to determine the angular position of an aircraft with respect to a ground station of known location. VOR ground stations transmit bearing information on separate assigned carrier frequencies so that an aircraft having a VOR receiver may tune in to a selected station or stations. Each ground station emits two 30 Hz sinusoidal information signals which are displaced in phase. One 30 Hz signal is a reference signal and is radiated with the same phase in all directions from the ground station. The other 30 Hz signal is a variable phase signal the phase of which varies with the angle of the radial on which the signal is transmitted. This signal has the same phase as the reference signal only at the 0° radial indicative of the direction north but is 90° out of phase with the reference signal at the 90° radial, is 180° out of phase at the 180° radial, and so on. At the aircraft a VOR receiver demodulates the carrier signal to detect the information signal comprised of the two 30 Hz sinusoidal waves and determines the phase difference between the two signals and thus the bearing of the aircraft with respect to the ground station.

The phenomenon of scalloping occurs when the phase relationship of the transmitted information signals becomes distorted at particular geographical locations. The distortion may be caused by a variety of permanent and temporary conditions in the propagational environment of the ground station, and to the pilot it appears as a somewhat random fluctuation in bearing from the ground station. While the problem may not be too severe if the pilot is using VOR to fly to a station it does cause serious problems if the output of the VOR converter is coupled to an autopilot since the autopilot will respond to these fluctuations by changing the attitude of the aircraft. Similarly the problem is severe if the output of the converter is used as an input to an area navigation unit and in these cases it is necessary to take measures to reduce the scalloping effect.

It is thus an object of the invention to provide a system and method for reducing the scalloping effect in a navigation system.

It is a further object of the invention to provide an improved digital phase shifter having an adjustable phase shift.

It is still a further object of the invention to provide an improved digital phase comparator.

It is still a further object of the invention to provide an improved pulse rate controller utilizing an analog timer.

The above objects are accomplished by providing a system which responds to changes in phase due to position changes of the aircraft but does not respond to the generally more rapid changes in phase which are due to scalloping. According to the invention the rate of change of phase is limited to the maximum possible change which could be due to a position change of the aircraft which is found to be $V/D$ where $V$ is the maximum speed of the aircraft and $D$ is the distance between the aircraft and the ground station. The system may also be effective against types of interference other than scalloping, such as multipath interference and thermal and receiver noise.

To limit the rate of change of phase a 30 Hz square wave is derived from the received 30 Hz reference signal and the phase of the square wave is continually shifted by a digital phase shifter/comparator unit to follow the phase of the received variable phase signal or of a square wave derived therefrom. The rate at which the phase of the reference square wave can be shifted is limited by an analog rate controller which controls the maximum permissible rate in approximate inverse proportion to the distance between the aircraft and the ground station. The phase shifted square wave is the output of the suppressor and the rate at which it can change is thus limited to the maximum rate which could be due solely to position changes of the aircraft.

The variable phase shift digital phase shifter is comprised of a pair of up-down counters. A number stored in the first counter is indicative of the phase shift or delay and upon the occurrence of the leading edge of the reference signal to be delayed this number is parallel loaded into the second counter which is then down counted, the end count signal being indicative of the delayed leading edge. The number is retained in the first counter and the delay can be increased or decreased by increasing or decreasing the stored number.

The digital phase comparator is comprised of a clocked bistable multivibrator having a variable phase square wave inputted thereto and being clocked at the time of occurrence of the delayed leading edge of the reference signal. The multivibrator determines whether the variable phase signal is low or high at the time of occurrence of the delayed reference signal and thus determines whether the delayed reference signal leads or lags the variable phase signal, and means are provided to pulse the first up-down counter to increase or decrease the number stored therein dependent on whether a lead or lag is indicated.

The analog rate controller inhibits pulses tending to change the number stored in the first counter in proportion to an analog voltage level inputted thereto which level is indicative of the distance between the aircraft and the ground station. The level is inputted to a comparator along with the voltage across a capacitor which is charged from a constant current source. When the voltage across the capacitor rises equal to the distance voltage the comparator generates an output and the time that it takes the capacitor to charge equal to the distance voltage is the time during which pulses tending to change the phase of the system output signal are inhibited.

The invention will be better understood by referring to the accompanying drawings in which.

The scalloping suppression system of the invention is essentially a closed loop feedback system. The system accepts at its input a square wave which is of the same phase as the received variable 30 Hz sine wave. At steady state, the output of the system is a square wave which is of the same phase as the input but the rate at which the phase of the output can change is limited to some maximum value and therefore there is a maximum rate at which the output can track the input. This is illustrated graphically in FIGS. 1 to 3.

Figure 1:
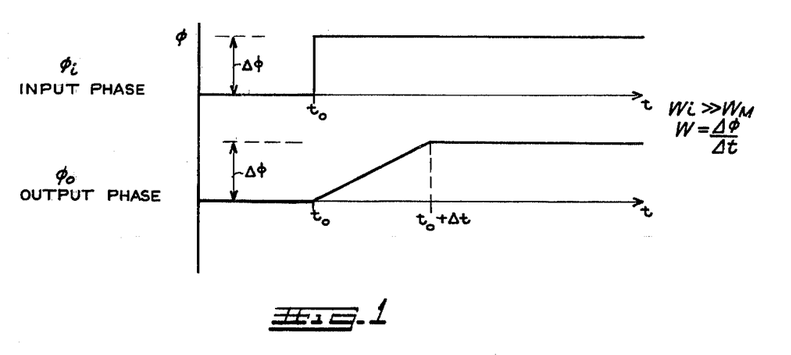
FIGS. 1, 2 and 3 are graphical illustrations of the phase change limiting properties of the system of the invention.

In FIG. 1 the phase of the input wave $\phi_i$ is a step function which instantaneously changes its value at time $t_0$. Since the input rate of change is much greater than the maximum permissible rate of change the phase of the output wave changes more slowly as shown in FIG. 1 and does not reach the upper value of the step input until time $t_0 + \Delta_t$.

Figure 2:
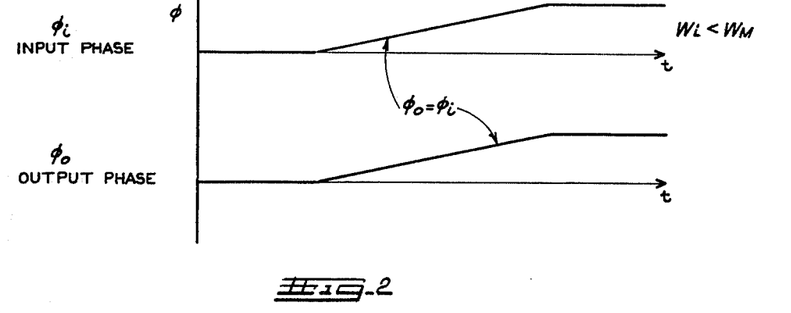

FIG. 2 illustrates the situation where the phase of the input wave changes as a ramp function and where the rate of change of input phase $\omega_i$ is less than the maximum permissible rate of change of phase $\omega_m$. In this case the output phase changes in exactly the same way as the input phase at all times. FIGS. 1 and 2 thus illustrate that the system of the invention can follow slow changes in phase of the input wave but not fast changes in phase.

Figure 3:
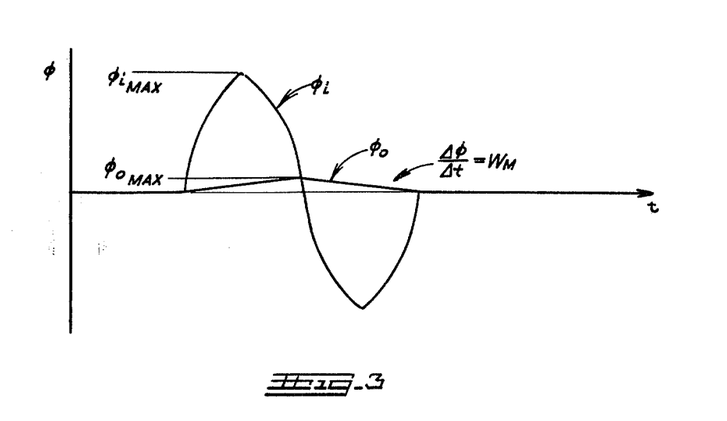

FIG. 3 illustrates how the system minimizes the effects of scalloping. In this Figure the scalloping phenomenon is modeled to be a zero mean sinusoidal fluctuation in the received radial and the rate of change of phase of this sinusoidal fluctuation is much greater than $\omega_m$. These assumptions are both intuitively and empirically correct. As shown in FIG. 3, the peak deviation at the output of the system is much less than the peak deviation at the input to the system and we can therefore choose $\omega_m$ to be the maximum rate of change of phase due to actual position change of the aircraft and still suppress the fast fluctuations which are presented by scalloping.

Figure 4:
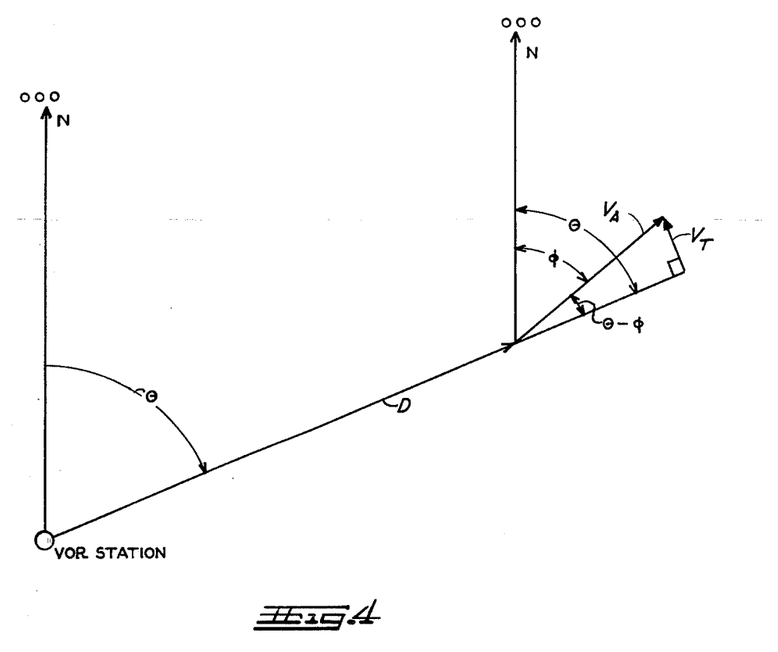
FIG. 4 is a diagram useful in deriving the expression for the maximum rate of change of phase which is due to changes in position of the aircraft itself.

The maximum rate of change of received phase which is due to an actual position change of the aircraft can be calculated from the dynamics of the situation and this is illustrated in FIG. 4. In the diagram of that FIG. D $\angle \theta$ is the aircraft position vector, $V_A$ is the aircraft velocity, $V_T$ is the tangential component of aircraft velocity, and $\phi$ is the angle of aircraft heading. THe apparent angular velocity of the aircraft about the VOR station is the component of its linear velocity which is orthogonal to its position vector with respect to the station divided by the magnitude of the position vector. Hence $\omega = V/D \sin(0 - \phi)$ and $\omega_{max} = V/D$. The magnitude of V can be considered a constant and might be set equal to the maximum speed of the aircraft and D is available as the output of distance measuring equipment (DME). Thus is we select $\omega_{max} = V/D$ the system can track any phase changes that occur due to an actual change in position of the aircraft and reject phase changes that occur faster than $\omega_{max}$.

Figure 17:
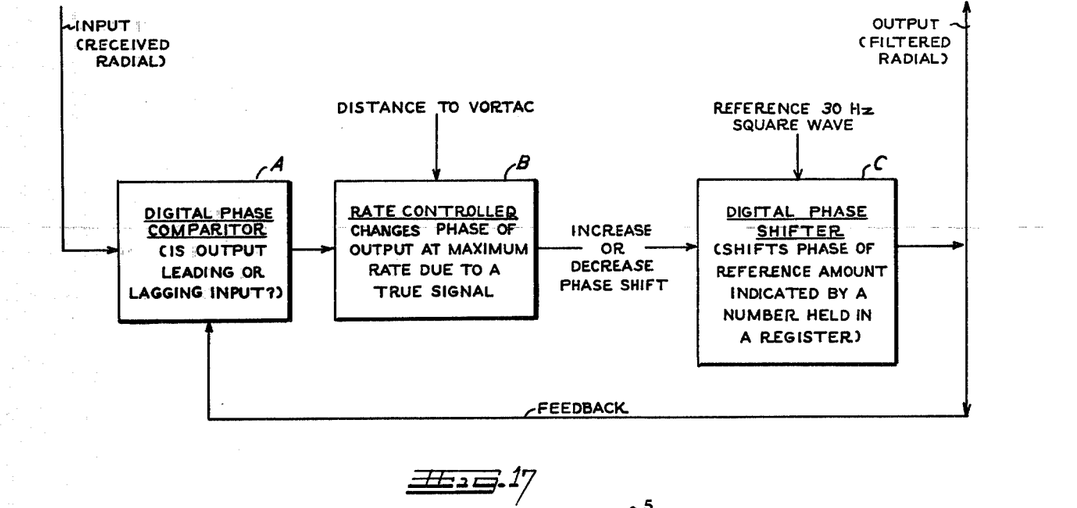
FIG. 17 is a simplified block diagram of the scalloping suppression system of the invention.

FIG. 17 is a simplified block diagram of the scalloping suppression system of the invention. The received 30 Hz sinusoidal reference wave is converted to a square wave and the square wave is fed to digital phase shifter C which shifts the phase of the reference wave by an amount proportional to a number which is held in a digital register which comprises a part of the digital phase shifter. The output of digital phase shifter C is fed to digital phase comparator A, as is a square wave which is derived from the variable 30 Hz received sinusoidal signal (denoted as the received radial in FIG. 17.) Phase comparator A determines whether the delayed reference wave leads or lags the variable phase wave and feeds a signal to digital phase shifter C to increase or decrease the stored number depending on whether the delayed reference leads or lags the variable phase signal. The increase or decrease signal is fed to phase shifter C through rate controller B which limits the rate of the increase or decrease adjustments in proportion to the distance from the aircraft to the VOR ground station which distance is inputted to the controller as an analog voltage. Hence the maximum rate at which the phase of the reference 30 Hz square wave can follow the phase of the variable 30 Hz square wave is limited to a value dependent on the aircraft to station distance which value as shown above is the maximum rate of change of phase due to actual changes in position of the aircraft. The output of digital phase shifter C is the output of the scalloping suppression system.

Figure 5:
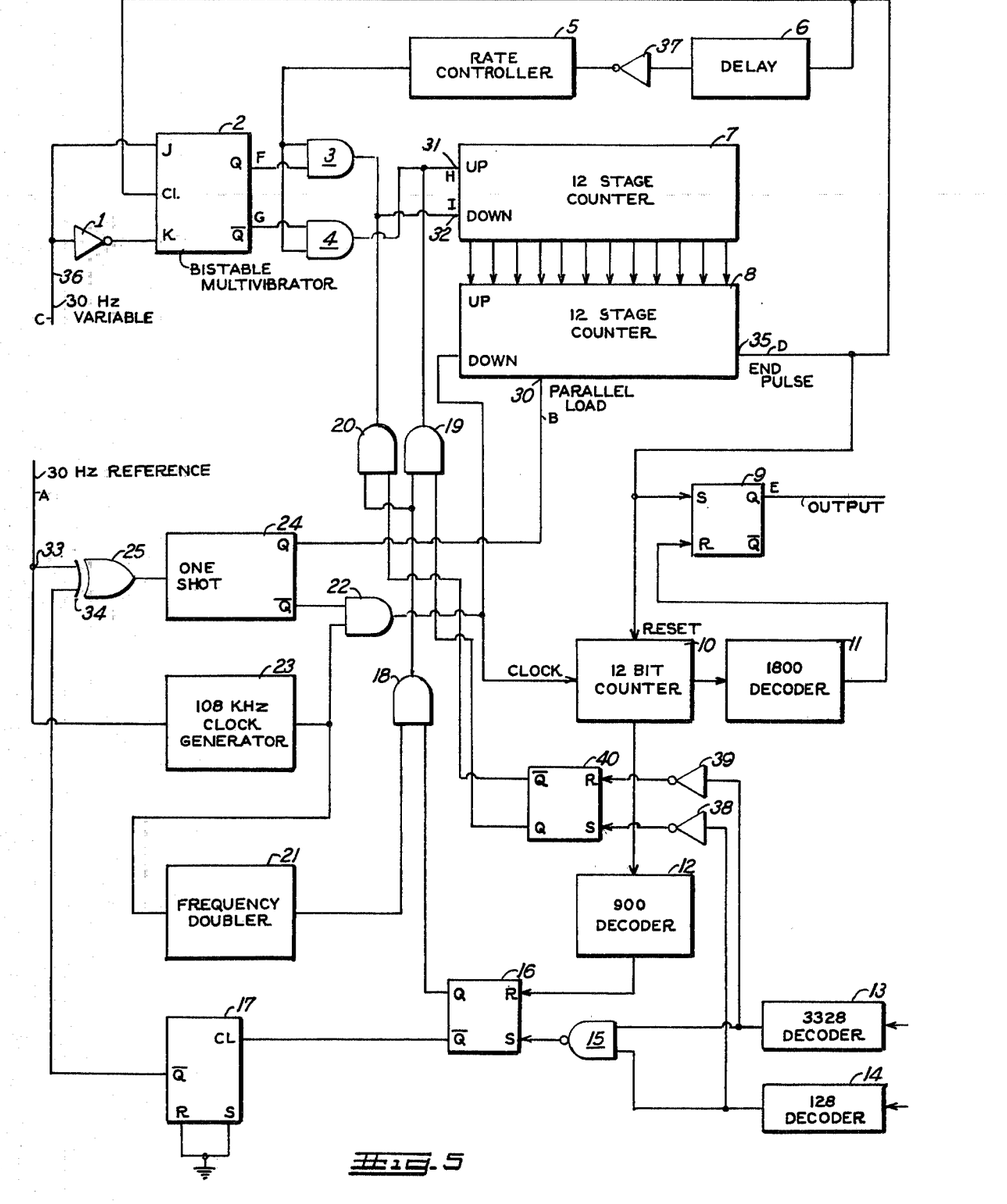
FIG. 5 is a detailed block diagram of the scalloping suppression system of the invention.
Figure 15:
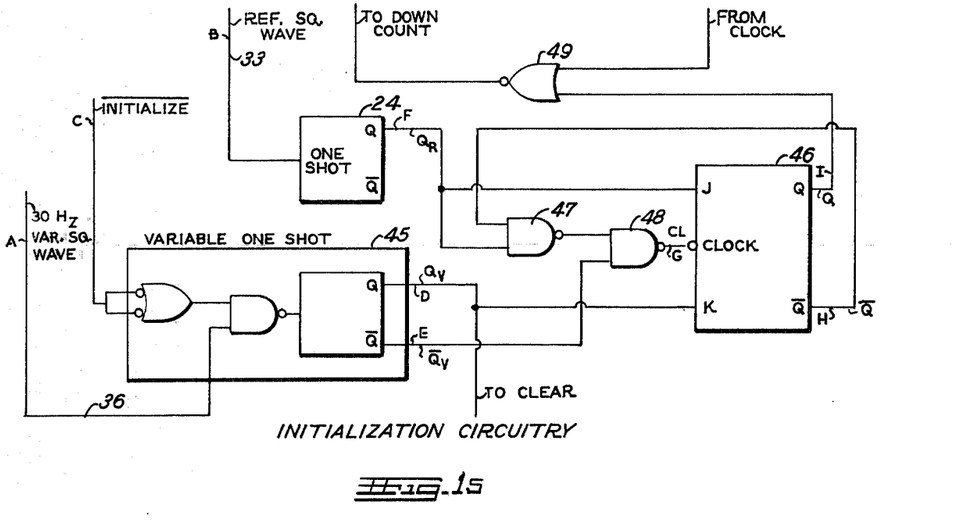
FIG. 15 is a circuit diagram of an initialization system.

FIG. 5 is a more detailed block diagram of the scalloping suppressor system of the invention and shows the essentials of the system except for the initialization circuitry which for purposes of clarity is shown in FIG. 15. An important part of the system is the digital phase shifter - phase comparator network comprised of up-down counters 7 and 8 and clocked bistable multivibrator 2. In the digital phase shifter the reference 30 Hz square wave is delayed by an amount proportional to a binary number which is stored in counter 7. Upon occurrence of the leading edge of the reference square wave the number is parallel loaded into counter 8 which is down counted to effect the delay or phase shift, the end of count pulse marking the beginning of the delayed reference signal.

The phase comparator 2 compares the phases of the received variable phase signal and the delayed signal outputted by counter 8. If the delayed reference signals leads the variable phase signal the phase comparator generates a pulse to increase the number held in counter 7 of the digital phase shifter. This increases the phase shift of the delayed signal and thus reduces the phase difference between the two signals. Thus process continues until the phase difference is essentially zero. Conversely if the delayed reference signal lags the variable phase signal the phase comparator generates a pulse to decrease the number in counter 7 of the phase shifter, reducing the phase difference until the two phases are essentially equal.

The rate controller 5 determines the rate at which the number which is held in counter 7 may be changed. In the operation of the system the phase comparator generates pulses to increase or decrease the stored number at a 30 Hz rate. Hence the number may be adjusted 30 times each second but the rate controller limits the rate of adjustment by inhibiting a percentage of the phase comparator outputpulses from being gated through to counter 7. In other words, if the pulse frequency at a distance of one mile is 30 Hz, then at a distance of 5 miles the rate controller passes only one out of every five pulses which results in a pulse frequency one-fifth that of the one mile rate or 6 Hz. At 100 miles the rate controller passes only one out of every one hundred pulses resulting in a 0.3 Hz rate. Since the number stored in the counter represents phase shift the rate at which the number is changed is the rate at which the phase of the reference signal can follow the phase of the variable phase signal. The rate controller is set so that this rate is the maximum rate of change due to an actual position change of the aircraft as discussed above.

A salient advantage of the present system is that it utilizes digital circuitry in critical areas. This provides for an extremely accurate system as well as eliminating the adverse effects of temperature and life upon the operation of the system. The accuracy of the phase shift produced by the digital phase shifter is based only on how well a selected number of periods of the clock frequency (3600 periods in the embodiment disclosed) approximates one period of the transmitted 30 Hz signal, and the use of a phase locked loop clock generator renders the clock frequency exact. An additional use for the scalloping suppression system of the invention is as a frequency synthesizer and it may be used in a way similar to phase locked loops. Additionally, use of the up-down counters in the phase shifter of the invention renders the amount of phase difference between input and output irrelevant and allows a greatly simplified and improved type of phase comparator which only indicates whether the signal is leading or lagging to be used. Also with the up-down counters, end point uncertainty and the problem of resetting the circuit when phase shifts of greater than 360° are encountered are eliminated. The first counter replaces the integrator of conventional type one position serves and its digital nature eliminates the inherent drift and offset problems of conventional current capacitance integrators. It is important to note that the digital phase shifter of the invention finds independent use by itself and may be used to replace a resolver in phase shifting applications. Because the phase accuracy of the signal shifted is not limited by temperature effects or component drift a digital resolver more accurate than conventional resolvers by orders of magnitude is realizable over a wide temperature range. Also because the system operates with square waves the need for high spectral purity sinusoids is eliminated and an easy interface for further digital processing is provided.

By the use of an analog timer the circuitry involved in the rate controller is considerably simplified. If a digital divide by N system were used the large counter necessary to accommodate the large range of values of N along with associated circuitry would be complex. The present rate controller provides a divide by N function over a wide range of values that is controlled by an analog voltage. The rate controller can also be used as a wide-range speed controller for A.C. machinery or as a proportional controller for applying power to an A.C. load. If zero crossing pulses were generated every time the A.C. line crossed the 0 voltage they could be applied to the rate controller and the output would be a pulse train having a frequency less than or equal to the line. Thus if the output of the rate controller were used to trigger a thyristor the power would be applied to the load in proportion to the D.C. control voltage.

Figure 6:
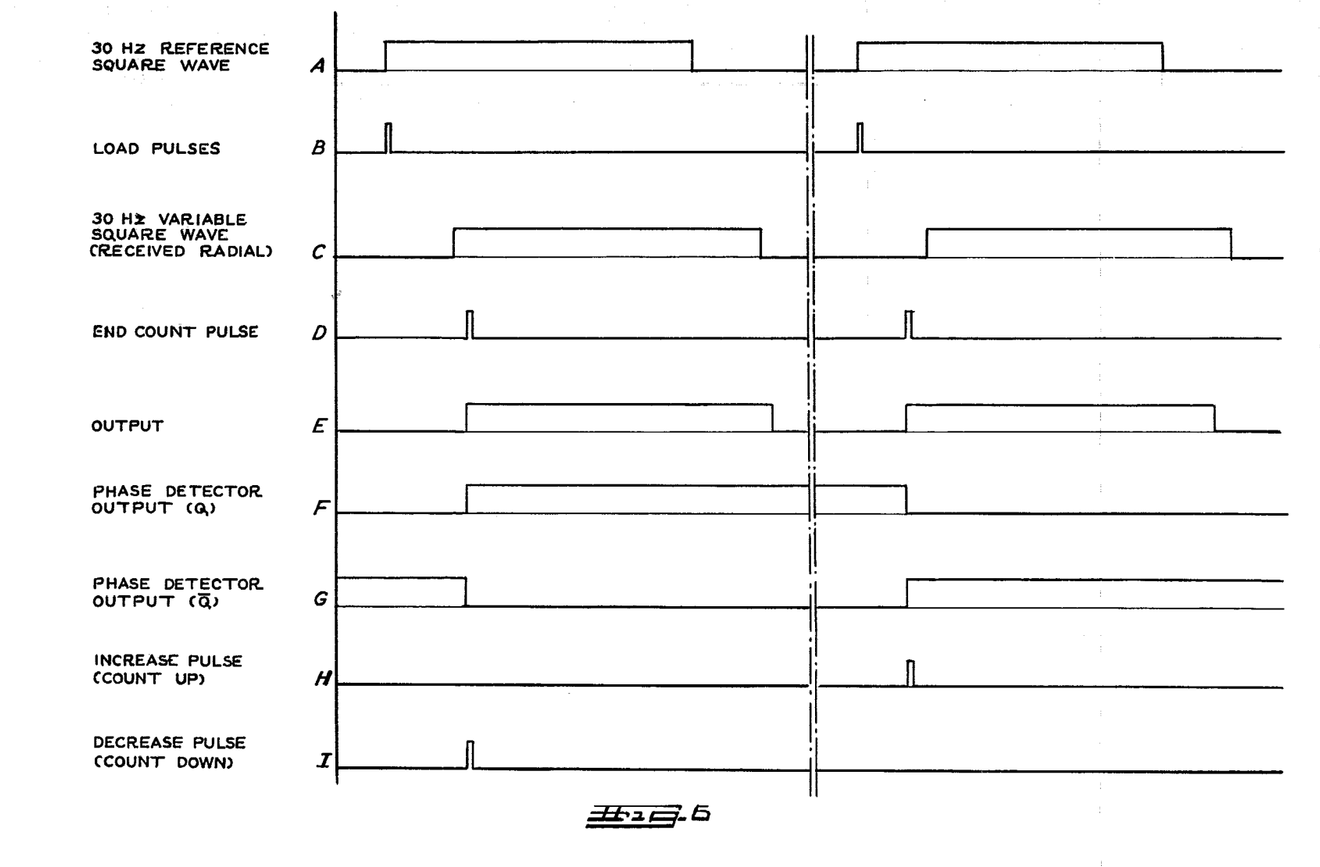
FIG. 6 is a waveform diagram useful in explaining the operation of the system of FIG. 5.

The operation of the system of FIG. 5 will now be described in greater detail in conjunction with the waveform diagram of FIG. 6. The received variable phase and reference sine waves are converted to square waves which are in phase with the sine waves by means not shown in FIG. 5. The 30 Hz reference square wave is inputted to the system at circuit point 33. It is fed to exclusive OR gate 25 which either inverts or does not invert the square wave depending upon whether input 34 of the gate is high or low. Assuming that the square wave is not inverted it is fed to one-shot multivibrator 24 and is shown at line A of FIG. 6. On the leading edge of the reference square wave one-shot multivibrator 24 fires providing a short pulse at the Q output shown at line B of FIG. 6. This pulse is fed to parallel load input 30 of counter 8 and is effective to transfer the number stored in counter 7 which is indicative of the amount of the delay to counter 8.

In the embodiment of the invention shown the maximum possible stored number is chosen to be 3599, the minimum number is zero and the reference square wave can therefore be shifted from 0° to 359.9° in steps of 0.1°. The proper clock frequency for counting down counter 8 is therefore 3600 × 30 or 108 KHz and since for proper operation the clock frequency should be within 0.01° of the correct frequency it has been found advantageous to utilize a phase locked loop having a divide by 3600 counter in its feedback path for clock generator 23 to multiply the 30 Hz input wave by exactly 3600.

After the one-shot multivibrator pulse at output Q ends the $\overline{Q}$ output of the one-shot multivibrator goes high thus gating the clock pulses outputted by the 108 KHz clock generator 23 through AND gate 22. These pulses are fed to the down count input of counter 8 and the counter is counted down until an end of count pulse is outputted at output 35 of the counter. The amount of time taken to count the counter down which is controlled by the number originally stored in counter 7 and transferred to counter 8 is the time that the reference square wave is delayed. The end of count pulse is shown at line D of FIG. 6. This end of count pulse is fed to the S input of bistable multivibrator 9 thereby causing the Q output of the multivibrator to go high and, as will be explained in greater detail below, this output is held high for a time equal to 50% of the duration of the square wave at which time the multivibrator is reset and the Q output goes low. Thus the delayed square wave is reconstructed at the Q output of bistable multivibrator 9.

The end of count pulse at output 35 of counter 8 is also fed to the clock input of bistable multivibrator 2 which is the phase comparator of the system. The 30 Hz variable square wave is inputted to the system at circuit point 36 and is fed to the J input of bistable multivibrator 2 as well as to the input of inverter 1, the output of which is fed to the K input of the bistable multivibrator. Bistable multivibrator 2 serves as a phase comparator in the following way. If at the time that the multivibrator is clocked the J input has a signal inputted thereto and the K input does not, this means that the variable square wave is high at the time that the leading edge of the delayed referene square wave occurs and that the reference square wave has been delayed too much. Under these conditions an output pulse will appear at the Q output of multivibrator 2 which may be fed through AND gate 3 to the down input of 12-stage counter 7 to reduce the number stored in the counter by one thereby reducing the delay. This condition is illustrated in the left-hand group of waveforms in FIG. 6 wherein it is noted that the end of count pulse at line D and the output pulse at line E occur while the variable square wave at line C is high. Thus as is seen on line F the Q output of the multivibrator will go high causing a down count pulse to be inputted to the counter as is seen on line I. On the other hand, if the J input to multivibrator 2 is low at the time that a clock pulse is inputted, an output will appear at output $\overline{Q}$ which is fed through AND gate 4 to the up input of 12-stage counter 7 thus increasing the number in the counter and the delay time. This situation is illustrated in the right-hand group of pulses in FIG. 6 where it is seen that the end of count pulse at line D occurs before the variable square wave at line C thus causing the output $\overline{Q}$ of the phase detector to go high and causing a count up pulse which is shown on line H. Thus it is seen how the phases of the delayed reference square wave and the variable square wave are compared by multivibrator 2 and the delay time of the counter system is adjusted accordingly to cause the delayed reference square wave to follow changes in phase of the variable square wave.

Figure 7:
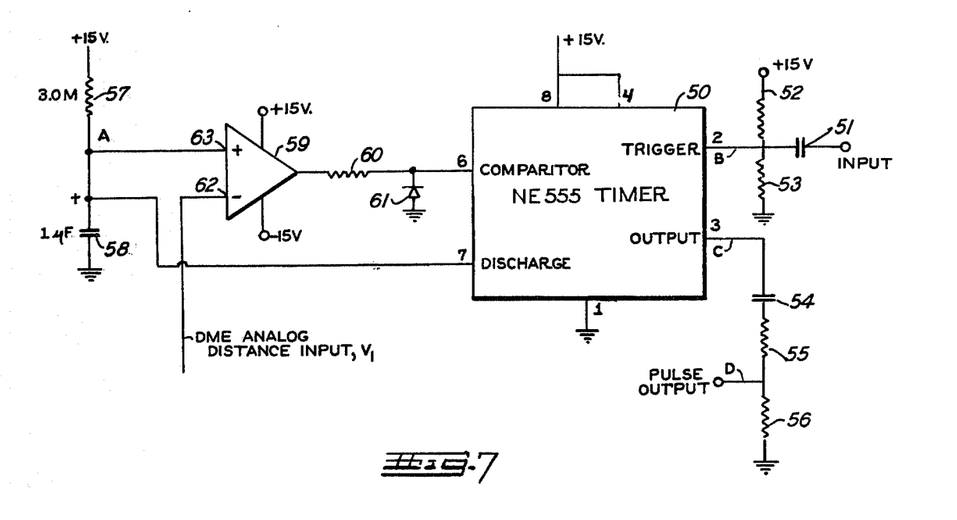
FIG. 7 is a circuit diagram of the rate controller of FIG. 5.

According to a further aspect of the invention the rate at which the delayed square wave can follow changes in phase of the variable square wave is controlled by rate controller 5 which is illustrated in greater detail in FIG. 7. Each end of count pulse at output 35 of counter 8 besides being fed to the clock input of multivibrator 2 is fed to delay network 6 and rate controller 5. The rate controller either inhibits or passes the pulses which are applied to it. The percentage of the pulses which the rate controller passes on to AND gates 3 and 4 is inversely proportional to the distance from the VOR station and is, hence, directly proportional to the maximum rate of phase change which could be due to an actual change in aircraft position. Delay 6 is adjusted so that the pulse output of rate controller 5 does not occur before multivibrator 2 changes state.

Figure 8:
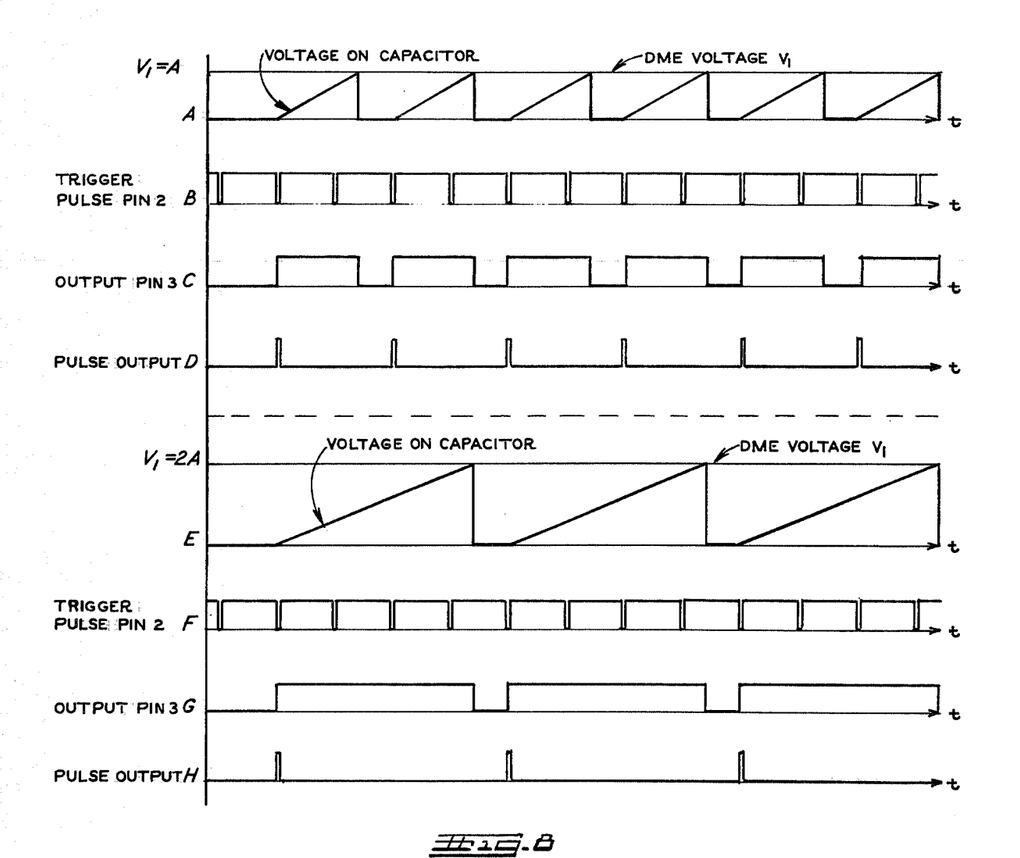
FIG. 8 is a waveform diagram useful in explaining the operation of the circuit of FIG. 7.
Figure 9:
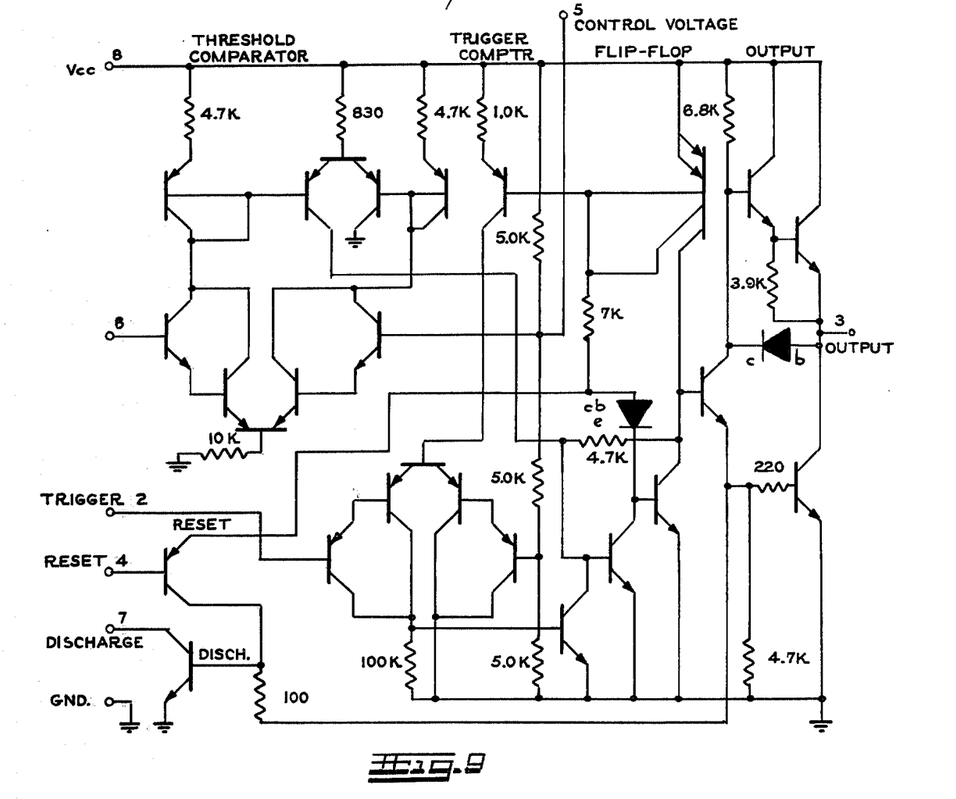
FIG. 9 is the circuit diagam of timer 50 of FIG. 7.

Because of its importance in the system the operation of rate controller 5 will be described in detail in conjunction with FIGS. 7 to 9 before the remainder of the system of FIG. 5 is described.

Referring to FIG. 7, the type 555 timer 50 is used as a monostable multivibrator. This timing circuit is commercially available as the Motorola MC1555 monolithic circuit or the Signetics NE555 and the schematic diagram thereof is shown in FIG. 9 pin 5 not being used in FIG. 7.

Referring to FIG. 7, capacitor 58 which may be a one uf capacitor is initially held discharged by a transistor within timer 50. When the timer is triggered by a negative-going pulse at pin 2 which is the output of inverter 37 in FIG. 5 inputted through capacitor-resistor network 51,52,53, the short or discharge circuit across capacitor 58 is released, this capacitor begins to charge through resistor 57, and the output at pin 3 of the timer goes high. The charging of the capacitor is shown at line A (of the waveform diagram shown in FIG. 8), and the output at pin 3 is shown on line C. A voltage $V_1$ which is proportional to the distance between the aircraft and the VOR station, and which may be obtained as the output of a DME is inputted to input 62 of comparator 59. Resistor 57 is chosen to be of an extremely high value, for instance, three megohms, as shown in FIG. 7, so that the combination of the 15 volt voltage source and resistor 57 approximates a constant current source. If greater accuracy is required, an actual current source may be used. This causes capacitor 58 to charge approximately linearly, and at some time during its charging the voltage across the capacitor, which is fed to input 63 of comparator 59, will exceed the DME analog distance voltage $V_1$ inputted to input 62 of the comparator. This will cause comparator 59 to emit an output signal which is fed to pin 6 of timer 50 which causes the output of the timer at pin 3 to go low and the short circuit across capacitor 58 to be restored. Thus it is seen at line C of FIG. 8 that the duration of the output at pin 3 is the time that it takes the capacitor to charge to the DME voltage value indicated as A on the figure. The output at pin 3 is differentiated by capacitor 54 and its level changed by resistors 55 and 56 resulting in the pulse output shown on line D. During the time that the output at pin 3 is high the timer 50 cannot be retriggered by input pulses on pin 2 and since the capacitor 58 charges approximately linearly the circuit produces only one output pulse for every two input pulses. Thus, it is seen in FIG. 8 that every other input pulse on line B is ignored. When the DME distance is doubled to 2A, as illustrated on lines E, F, G and H of FIG. 8 it takes capacitor 58 twice as long to charge to the DME voltage level and one output pulse is produced for every four input pulses. Thus when the rate controller of FIG. 7 is utilized in FIG. 5 it is seen how a percentage of pulses from phase comparator 2 may be inhibited from reaching counter 7 and from changing the count thereof.

Referring again to FIG. 5 besides being fed to phase comparator 2 and to the multivibrator 9 the end of count pulse at output 35 of counter 8 is also fed to the reset input of 12 bit counter 10 thereby resetting this counter to the zero state. Clock pulses from clock generator 23 start counting counter 10 up until the number 1800 is reached at which point decoder 11 which may be a conventional decoder as known to those skilled in the art detects the number 1800 and provides an output signal to the reset input of the multivibrator 9 thus causing the signal at output Q of multivibrator 9 to go low. Such an arrangement insures that the output square wave has a 50% duty cycle as phase may be significant in, for instance, an analog computer in which the output may be utilized, and analysis has shown that variation from a 50% duty cycle of only 1% contributes a phase error of 3.6°. The divide by 1800 counter allows the output to stay high for exactly 1800 counts or 180° of the 30 Hz frequency thus insuring a 50% duty cycle.

It should be noted that the digital number stored in counter 7 at any time is indicative of the phase difference between the reference square wave and the variable square wave. In order to determine bearing, therefore, instead of further processing the output signal of multivibrator 9 and comparing its phase to the reference phase the number stored in counter 7 may be decoded and used as an indication of bearing.

Figure 10:
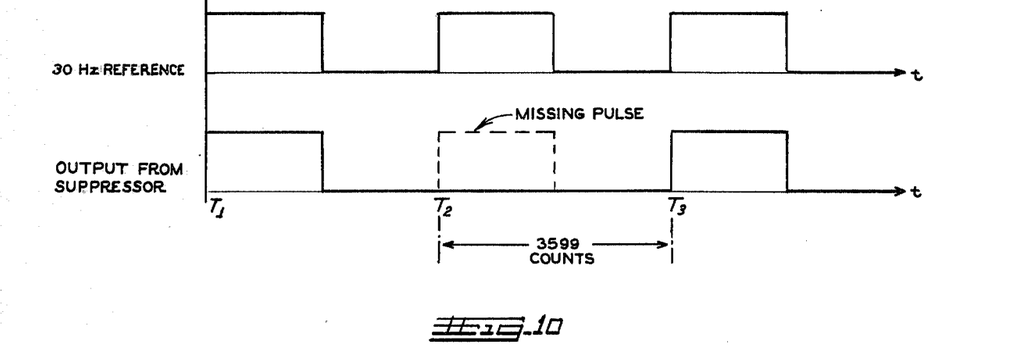
FIG. 10 is a diagram illustrating the missing pulse problem encountered when passing through zero phase shift.

The remaining circuitry shown in FIG. 5 is utilized to obviate two operational problems. Referring to FIG. 10, assume that the bearing from the station is some extremely small number, for example, 0.2°, and that the aircraft is proceeding in a westerly direction so as to cause this number to decrease to zero. Assume then in FIG. 10, that at time $T_1$, the number zero is loaded into counter 8 and since it takes no time to count the counter down an output is obtained immediately. Assuming that the phase continues to decrease, on the next positive going edge of the reference 30 Hz signal at time $T_2$ the number 3599 (359.9° or −0.1°) is loaded into counter 8. Thus the output is delayed 3599 counts from time $T_2$ and as can be seen from FIG. 10 one cycle of the output, marked as the missing pulse in the figure, is lost.

The second problem obviated by the additional circuitry in FIG. 5 results from the unavoidable deterioration which the received reference signal undergoes during transmission, causing the received phase of this signal to be inexact. If the number loaded into the digital phase shifter is a large number, for example indicative of a phase shift of 359.9° then a phase shift of the reference signal of only 0.1° (less than 0.03%) could cause the signal to be absent from the output. This is because with the number 3599 loaded into counter 8 if the next rising edge of the reference 30 Hz signal is only slightly early (even 15 microseconds) a new number will be loaded into counter 8 before it has counted down to zero and hence there will be no output for this cycle.

It was noted that both of the above problems could be eliminated by avoiding operation with both very low numbers and very high numbers stored in the counters. Slew circuitry is provided to prevent operation with very low and very high numbers and the function thereof is explained with reference to the flow chart of FIG. 11.

Figure 11:
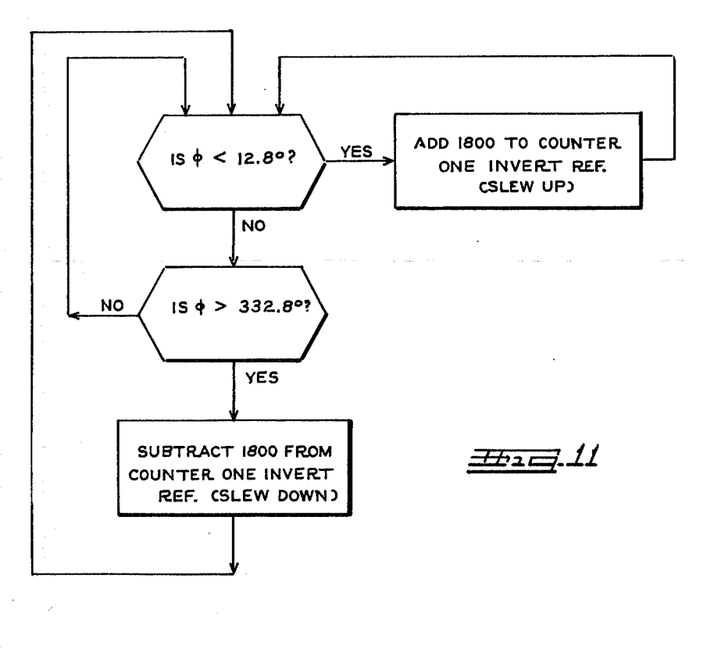
FIG. 11 is a flow chart of the slew operation.

If the number in counter 7 gets too small (12.8° is chosen in this embodiment), then the number 1800 is added to it which causes a 180° phase shift and places the counter in a more advantageous operating position, but at the same time the reference signal is inverted thus and the output stays in the same phase relationship to the true reference signal. Similarly if the number stored in counter 7 gets too large (332.8° is chosen in this embodiment) then 1800 is subtracted from the counter and the reference waveform is inverted.

Figure 12:
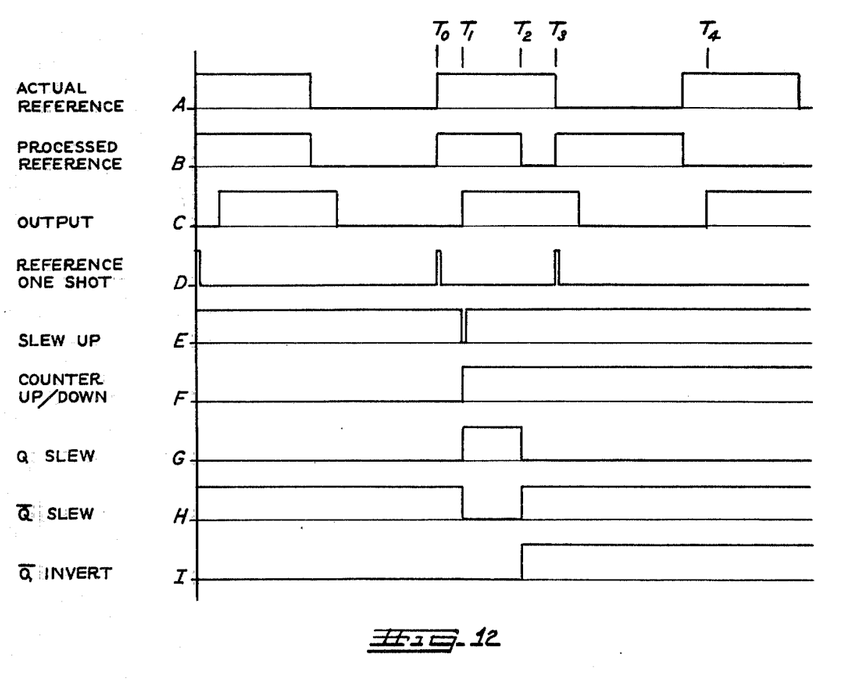
FIG. 12 is a waveform diagram of the slew up operation.

The circuitry in FIG. 5 for accomplishing the slew operation will now be described in conjunction with the waveform diagrams of FIGS. 12 and 13. Decoders 13 and 14 are provided and these decoders are connected to the output stages of counter 7 (not shown) as known to those skilled in the art so that the outputs thereof go low when the numbers 3328 and 128 respectively are detected. Assuming that the number 129 is loaded in counter 7 and referring to FIG. 12 which illustrates the slew up waveforms, at time $T_0$ when the reference one shot goes high the number 129 is loaded into counter 8 and 129 clock pulses later at time $T_1$ an end of count pulse is obtained which resets counter 10, sets output latch 9 and after phase comparison causes the counter 7 to be decreased by 1 to 128. The 128 state is detected by decoder 14, the output of which goes low resulting in the occurrence of the slew up pulse shown in line E of FIG. 12. The slew up pulse is inverted by inverter 38 and applied to the set input of bistable multivibrator 40 thereby resulting in the Q output of that multivibrator going high to apply a gate signal to one input of AND gate 19. The slew up signal causes the output of NAND gate 15 to go high thus applying a signal to the set input of bistable multivibrator 16 resulting in the Q output of that multivibrator going high and applying a gate signal to one input of AND gate 18. The output of clock generator 23 is fed to frequency doubler 21 the output of which is a pulse stream at double the frequency of the output of the clock generator. When flip-flop 16 is set the output of frequency doubler 21 is gated through AND gate 18 and in the slew up operation through AND gate 19 to the up input of counter 7. Since the number in counter 7 is changed to 128 synchronously with the beginning of an output signal it is possible to use counter 10 to control the duration of the double frequency up count of counter 7. To accomplish this the output of counter 10 is connected to 900 decoder 12 the output of which goes high when counter 10 has counted to 900, resetting multivibrator 16 and causing the Q output of the multivibrator to go low thus inhibiting the pulses from passing through gate 18, and ending the up count of counter 7. Since counter 7 was counted up at a clock frequency twice that at which counter 10 is clocked when counter 10 has counted 900 pulses the count in counter 7 has been increased by 1800. The $Q_{slew}$ waveform on line G of FIG. 12 shows that multivibrator 16 is set for the duration of 1800 clock pulses, and at time $T_2$ when it is reset the number in counter 7 is 1928.

At time $T_2$ the reference waveform is inverted as shown in line B of the Figure and in the system of FIG. 5 this is accomplished by clocking multivibrator 17 when multivibrator 16 becomes reset. Multivibrator 17 is arranged so that the $\overline{Q}$ output changes state each time a pulse appears on the clock input of the multivibrator. The 30 Hz reference signal is fed into the system at point 33 and is fed to exclusive OR gate 25, the output of which is either the reference signal or the reference signal inverted depending on the state of the signal at input 34 of gate 25. Each time the state of the output of multivibrator 17 changes the output of the waveform from exclusive OR gate 25 is inverted. This is shown in line I of FIG. 12 and in line B it is seen that at time $T_2$ the reference waveform is inverted. At time $T_3$ the number 1928 is loaded into counter 8 and the output is delayed 1928 clock periods from $T_3$ which produces an output on line C at time $T_4$. Hence by increasing the count of counter 7 by 1800 and by simultaneously inverting the reference signal the output signal keeps the same relationship with the actual reference while the counter is moved to a more advantageous region of operation.

Figure 13:
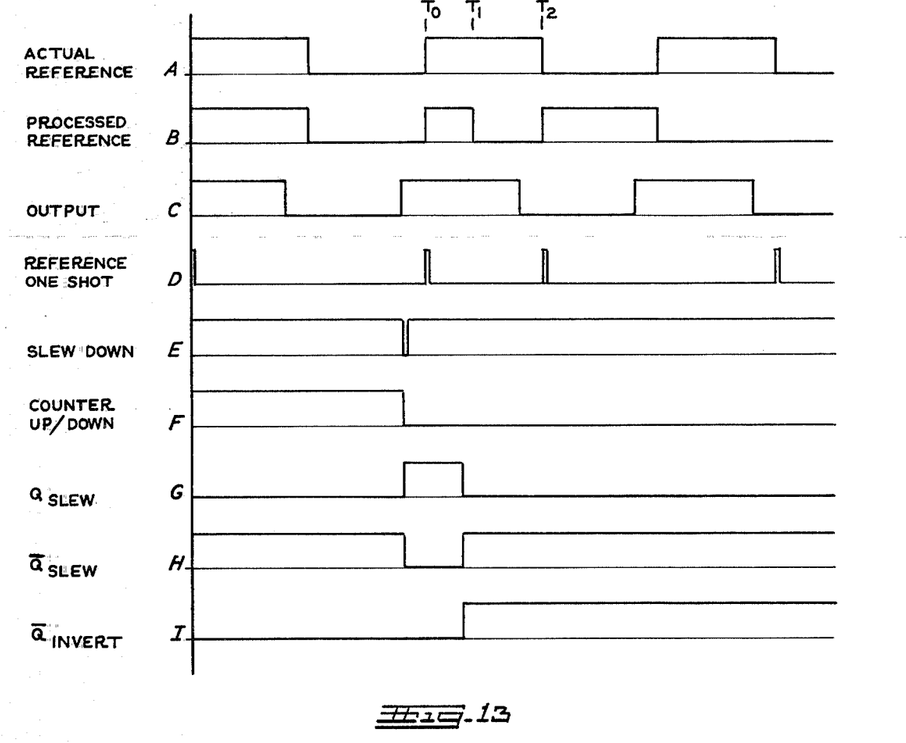
FIG. 13 is a wave form diagram of the slew down operation.

The slew down operation proceeds in a similar manner and is illustrated in conjunction with the waveforms of FIG. 13. On the first reference one-shot pulse shown in that Figure assume that the number 3327 is loaded into counter 8. 3327 clock pulses later and end of count pulse occurs resetting counter 10, setting output latch 9 and increasing the number in counter 7 to 3328. This number is detected by 3328 decoder 13 which goes low as is seen on line E of FIG. 13. This signal is inverted in inverter 39 thereby resetting bistable multivibrator 40 causing the $\overline{Q}$ output thereof to go high which output is applied to one input of AND gate 20 the output of which is connected to the down input of counter 7. The slew down pulse at the output of decoder 13 also causes the output of NAND gate 15 to go high thus setting multivibrator 16 which in turn enables the output of frequency doubler 21 to be passed through AND gate 18 and from there through AND gate 20 to the down input of counter 7. Again counter 10 is used to clock the 1800 counts, the output of 900 decoder 12 resetting multivibrator 16 at time $T_1$, the duration of the multivibrator signal being shown in line G of FIG. 13. The reference signal is inverted by multivibrator 17 and exclusive OR gate 25 as described above at time $T_1$ and at time $T_2$ a reference one-shot pulse responsive to the leading edge of the inverted reference loads the number 1528 into counter 8. Thus the output keeps the same phase relationship with the actual reference signal.

An initialization procedure is necessary for counter 7 of FIG. 5 because at certain times during the operation of the system, for instance at turn-on, the number in counter 7 may be far different than that which represent the correct phase shift and it is necessary in these instances to change the number rapidly without going through the cycle by cycle phase comparison routine described above to approximately the correct number. For purposes of clarity of illustration the initialization circuitry is not shown in FIG. 5, but rather is shown in FIG. 15 and will be described in conjunction with FIGS. 14 to 16.

Figure 14:
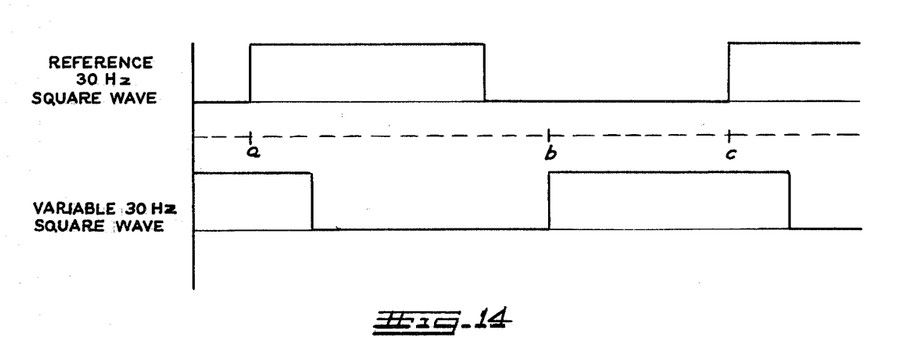
FIG. 14 is a waveform diagram useful in explaining how initialization of counter 7 is accomplished.

Initialization is achieved by appreciating the fact that the number in counter 7 at steady state is the number of clock pulses which occur after the rising edge of the reference 30 Hz square wave and before the rising edge of the variable 30 Hz square wave. Referring to FIG. 14 it is seen that the distance ab represents the necessary delay and counter 7 may be reset to all zeros at point $a$, and clock pulses counted from point $a$ until point $b$. The count in the counter at point $b$ would represent the phase shift of the variable square wave with respect to the reference square wave. Since the time ac is represented by all zeros, an easier process to implement is to subtract $bc$ from $ac$ by counting down from all zeros from time $b$ until time $c$. Hence the procedure utilized in the present system is to reset the counter to all zeros, enable a down count upon the rising edge of the variable 30 Hz square wave and disable the down count upon the rising edge of the reference 30 Hz square wave.

Figure 16:
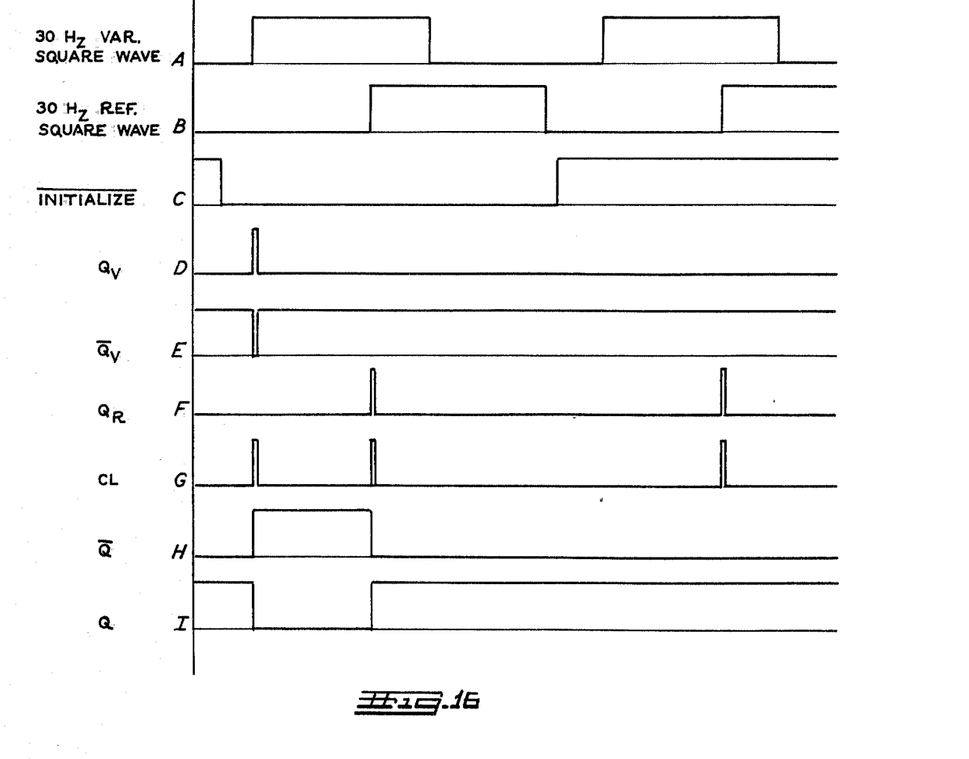
FIG. 16 is a waveform diagram useful in explaining the operation of the initialization system of FIG. 15.

FIG. 15 is a block diagram of the initialization circuitry used to accomplish the above process. The variable square wave one-shot multivibrator 45 which is connected to circuit point 36 in FIG. 5 produces pulses upon the rising edge of the variable 30 Hz square wave only when the initialization signal is low. The initialization signal may be arranged to be low under any selected conditions according to the design of the system, for instance when the output is more than 20° different from the input or when there is a flag from some other part of the system. With the initialization input low, as illustrated in FIG. 16, line D, upon occurrence of the leading edge of the variable 30 Hz square wave the $Q_v$ output of the one-shot multivibrator goes high and clears counter 7 to all zeros. Assuming the Q output of bistable multivibrator 46 had been high, a clock pulse is applied to the clock input of the multivibrator as shown on line G of FIG. 16. At this time J is low and K is high and hence the multivibrator changes state and the Q output goes low. With the Q output low a clock input from the clock generator 23 of FIG. 5 is enabled through gate 49 and this clock input is applied through appropriate gating as would be known to those skilled in the art to the down input of counter 7. Upon the leading edge of the reference 30 Hz square wave reference one-shot multivibrator 24, also shown in FIG. 5, goes high on the Q output and applies a clock pulse to the multivibrator 46. At this time J is high, K is low and hence the output Q becomes high thus inhibiting further clock pulses from passing through NOR gate 49. While the Q output of multivibrator 46 was low clock pulses indicative of the distance bc in FIG. 9 were down counted from the zero state of computer 7 thus initializing the counter with a number indicative of the delay ab.

Further continuing the sequence it is important to not that no further changes of state of multivibrator 46 are possible until another pulse is produced by the variable one-shot 45. This is important because it prevents the initialization circuitry from taking on undesired states. For instance if upon power turn-on the multivibrator takes on the zero state it is set to the one state upon the first rising edge of the 30 Hz reference square wave and it stays in this state until an initialization signal is received.

While specific embodiments of the invention have been disclosed and described the invention is not limited solely thereto but rather includes all embodiments which would be apparent to one skilled in the art and which come within the spirit and scope of the invention.

What is claimed is:

1. A scalloping suppression system for use in a bearing determining apparatus wherein the bearing of an object relative to a station is determined by comparing at said object the relative phase of a reference signal and a variable phase signal emitted at said station, comprising means for deriving from said reference signal a first signal having the same phase as said reference signal and means for deriving from said variable signal a second signal having the same phase as said variable phase signal, means for causing the phase of said first signal to follow changes in the phase of said second signal, means for limiting the rate of change of phase of said first signal to the maximum rate which could be due to an actual bearing change between said object and said station, said phase following means including means for separately delaying each cycle of said first signal and means for separately phase comparing each delayed cycle of said first signal with a cycle of second signal.

2. A scalloping suppression system for use in a bearing determining apparatus wherein the bearing of an aircraft relative to a station is determined by comparing at said aircraft the relative phase of a reference signal and a variable phase signal emitted at said station, comprising means for deriving from said reference signal a first signal having the same phase as said reference signal and means for deriving from said variable phase signal a second signal having the same phase as said variable phase signal, means for delaying said first signal including means for delaying only a single cycle of said first signal at any time, means for comparing the time of occurrence of one of said delayed cycles with the time of occurrence of a cycle of said second signal, means for adjusting the delay time of said means for delaying up or down depending on whether said delayed cycle leads or lags said cycle of said second signal, and means for limiting the rate at which said delay time can be adjusted to the maximum rate which could be due to an actual bearing change between said aircraft and said station.

3. The system of claim 2 wherein said means for delaying includes at least one digital register means.

4. The system of claim 3 wherein said means for delaying includes a counter which is down counted to provide said delay time.

5. The system of claim 3 wherein said means for comparing comprises a bistable means.

6. The system of claim 4 wherein said means for delaying comprises first and second up-down counters, means for causing a number stored in said first counter to be parallel loaded into said second counter upon the occurrence of the leading edge of each cycle of said first signal, means for down counting said second counter to provide said delay time, and said means for adjusting the delay time comprising means for adjusting the number stored in said first counter.

7. The system of claim 6 wherein said first and second signals are two-level signals and said means for comparing comprises means for determining whether said second signal is high or low at the time of occurrence of each delayed cycle of said first signal.

8. The system of claim 7 wherein said first and second signals are square waves and wherein said means for comparing comprises a clocked bistable multivibrator, said second signal being inputted to one of the set or reset inputs of said multivibrator and said delayed first signal being inputted to the clock input, said multivibrator performing a phase comparison on each corresponding pair of cycles from said delayed first signal and said second signal, signals indicative of the outputs of said multivibrator for each said pair of cycles being fed to said first counter for increasing or decreasing the number stored therein.

9. The system of claim 8 wherein said means for limiting comprises means for inhibiting a proportion of said signals indicative of the outputs of said multivibrator from being fed to said first counter.

10. The system of claim 9 wherein said means for inhibiting comprises means for accepting input pulses and for inhibiting a proportion of said pulses which is directly related to the amplitude of an analog control signal.

11. The system of claim 10 wherein said means for inhibiting is responsive to a first input pulse for producing an output pulse but is not responsive to input pulses following said first pulse until triggered, means for actuating analog timing means responsive to said first pulse for providing a trigger pulse when it times out for triggering said means for inhibiting, said timing means having a timing duration which is proportional to the amplitude of said analog control signal.

12. The system of claim 11 wherein said analog timing means comprises a comparator having a control signal as one input thereto and the voltage across a timing capacitor as the other input thereto, and substantially constant current source means for charging said capacitor responsive to said first input pulse.

13. The system of claim 8 further including means for initially adjusting said stored number upon the occurrence of a command signal so that said delayed first signal and said second signal are approximately in phase, comprising means for loading said first up-down counter with a number representing the delay between the occurrence of the leading edge of a cycle of said first signal and the occurrence of the leading edge of the corresponding cycle of said second signal.

14. The system of claim 13 wherein said means for loading comprises means for detecting the occurrence of the leading edge of a cycle of said second signal for clearing said first counter and commencing down counting when said occurrence is detected, and means for stopping said down counting when the leading edge of said corresponding cycle of said first signal is detected.

15. The system of claim 14 wherein said means for detecting comprises one-shot multivibrator means and said means for stopping includes bistable multivibrator means.

16. The system of claim 6 wherein said first and second signals are square waves, said means for down counting said second counter comprises a clock means outputting a pulse stream, the end of count output signal of said second counter indicating the beginning of a delayed cycle, and means responsive to said end of count signal for reconstructing a square wave having a 50% duty cycle.

17. The system of claim 16 wherein said means for reconstructing a square wave includes a counter means connected to said clock means for counting a predetermined number of pulses equal to half the period of said square wave.

18. The system of claim 17 wherein said end of count signal triggers a bistable device which is held high until said counter means counts said predetermined number of pulses.

19. The system of claim 6 further including means for preventing the number stored in said first counter from falling beneath a predetermined minimum number.

20. The system of claim 6 further including means for preventing the number stored in said first counter from increasing above a predetermined maximum number.

21. The system of claim 19 wherein said means for preventing comprises means for detecting the occurrence of said predetermined minimum number in said first counter, means for adding a number to said first counter which is equivalent to half of a cycle of said first signal upon detecting said occurrence, and means for inverting said first signal.

22. The system of claim 20 wherein said means for preventing comprises means for detecting the occurrence of said predetermined maximum number in said first counter, means for subtracting a number from said first counter which is equivalent to half of a cycle of said first signal upon detecting said occurrence and means for inverting said first signal.

23. The system of claim 21 wherein said means for down counting comprises a clock means emitting a pulse stream at a first frequency and wherein said means for adding a number includes frequency doubler means connected to said clock means, said frequency doubler means being connected to said first counter to increase the number thereof at a second frequency twice that of said first frequency and decoder means for detecting a number of said clock means output pulses at said first frequency equal to half the number which is added to said first counter.

24. A method of providing a number indicative of the bearing of an aircraft relative to a station wherein the relative phases of a reference signal and a variable phase signal emitted at said station are compared at said aircraft, comprising the steps of deriving from said reference signal a first signal which has the same phase as said reference signal, deriving from said variable phase signal a second signal which as the same phase as said variable phase signal, delaying a cycle of said first signal for a delay time and providing a number representative of said delay time, comparing the time of occurrence of said delayed cycle of said first signal with the time of occurrence of a cycle of said second signal, adjusting said delay time and said number up or down depending on whether said delayed cycle leads or lags said cycle of said second signal, delaying the next cycle of said first signal for said adjusted delay time, whereby said number is indicative of the relative phase between said first and second signals and between said aircraft and said station.

* * * * *